United States Patent [19]
Martenson et al.

[11] Patent Number: 6,040,971
[45] Date of Patent: Mar. 21, 2000

[54] CIRCUIT PROTECTION DEVICE

[76] Inventors: Kenneth R. Martenson, 54 High Rd., Newbury, Mass. 01951; Jerry L. Mosesian, 5 Russia St., Newburyport, Mass. 01950; Alan F. Wilkinson, 219 S. Rd., Kensington, N.H. 03827; William Goldbach, 10490 Dunkirk Rd., Spring Hill, Fla. 34608

[21] Appl. No.: 09/093,367

[22] Filed: Jun. 8, 1998

[51] Int. Cl.⁷ .................................................... H02H 1/00
[52] U.S. Cl. ......................... 361/118; 361/127; 361/103
[58] Field of Search ................................ 361/56, 91, 111, 361/117–118, 126–127, 103, 102

[56] References Cited

U.S. PATENT DOCUMENTS

| | | |
|---|---|---|
| 4,288,833 | 9/1981 | Howell . |
| 4,493,005 | 1/1985 | Lange . |
| 4,538,201 | 8/1985 | Wuyts et al. . |
| 4,720,759 | 1/1988 | Tabei . |
| 4,887,183 | 12/1989 | Biederstedt et al. . |
| 4,901,183 | 2/1990 | Lee ............................................ 361/56 |
| 5,101,180 | 3/1992 | Frey ......................................... 333/12 |
| 5,311,393 | 5/1994 | Bird . |
| 5,379,176 | 1/1995 | Bacon et al. ............................. 361/106 |
| 5,379,177 | 1/1995 | Bird . |
| 5,392,188 | 2/1995 | Epstein .................................... 361/118 |
| 5,404,126 | 4/1995 | Kasai et al. . |
| 5,495,383 | 2/1996 | Yoshioka et al. ......................... 361/56 |
| 5,574,614 | 11/1996 | Busse et al. . |
| 5,644,283 | 7/1997 | Grosse-Wilde et al. . |
| 5,675,468 | 10/1997 | Chang .................................... 361/119 |

OTHER PUBLICATIONS

Harris Semiconductor, "Transient Voltage Suppression Devices," Transient V–I Characteristics Curves, p. 4–57, (Jun. 8, 1995).

*Primary Examiner*—Michael J. Sherry
*Attorney, Agent, or Firm*—Mark Kusner

[57] ABSTRACT

A transient voltage surge suppression system incorporating a current protection device comprised of a voltage sensitive and a thermal sensitive device. The voltage sensitive device has a predetermined voltage rating and increases in temperature as voltage applied thereto exceeds its voltage rating. The thermal sensitive device is responsive to heating of the voltage sensitive device to break an electrical current path if an overvoltage condition sensed by the voltage sensitive device exceeds the voltage rating of the voltage sensitive device.

12 Claims, 5 Drawing Sheets

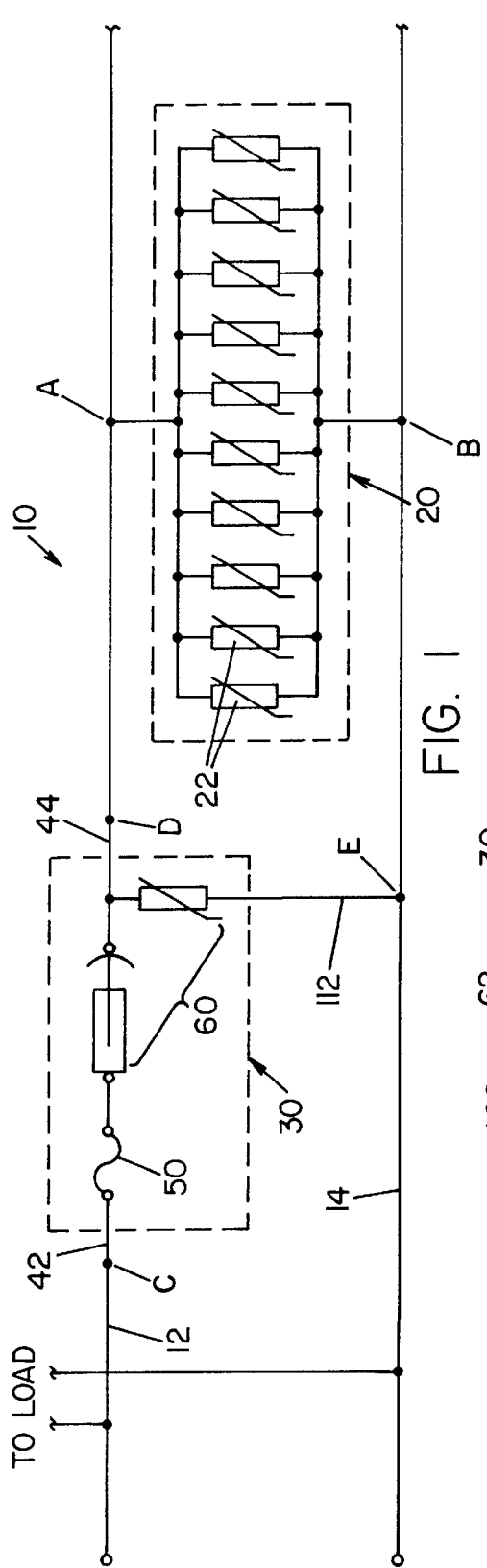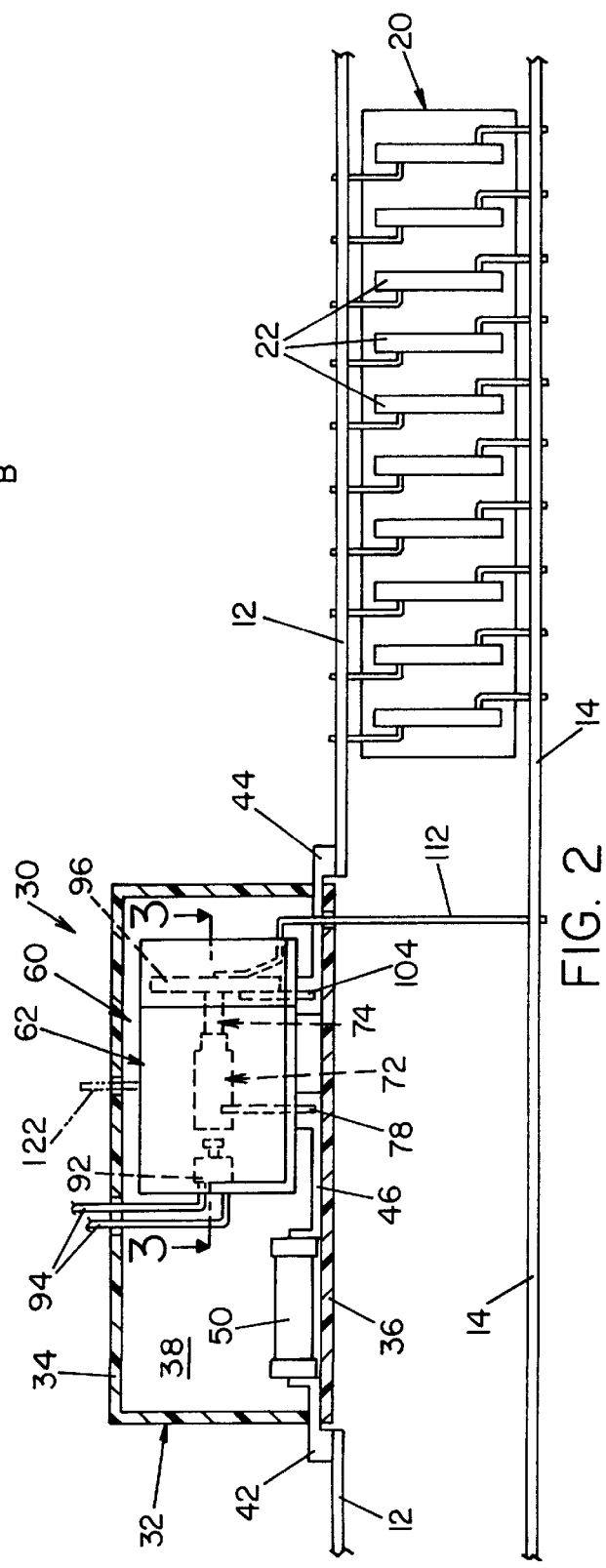

CIRCUIT PROTECTION DEVICE

FIELD OF THE INVENTION

The present invention relates generally to circuit protection devices, and more particularly to a device that suppresses transient current/voltage surges.

BACKGROUND OF THE INVENTION

Many of today's highly sensitive electronic components, such as computer and computer-related equipment, that are used in commercial and residential applications contain transient voltage surge suppression (TVSS) devices to protect sensitive and/or expensive electronic circuits and components from damage from over-voltage fault conditions. Such transient voltage surge suppression systems are typically designed for moderate fault conditions that can be expected in normal use. In this respect, such systems are designed to suppress relatively minor fault conditions, but are not designed to protect against major over-voltage conditions such as those that may occur from losing the system neutral or ground termination, or from repetitive current pulses which may occur from lightning strikes. Such major over-voltage conditions can have catastrophic effects on sensitive electronic circuits and components. To prevent such fault conditions from reaching and damaging electronic circuits, components and equipment, it has been known to utilize larger voltage surge suppression devices at a building's incoming electrical service power lines, or within a building's power distribution grid to control power surges in the electrical lines to the building, or in the electrical lines to specific floors of the building. Such voltage surge suppression devices typically include a plurality of metal-oxide varistors (MOVs) connected in parallel between a service power line and a ground or neutral line, or between a neutral line and a ground line.

MOVs are non-linear electronic devices made of ceramic-like materials comprising zinc-oxide grains and a complex amorphous inner granular material. Over a wide range of current, the voltage remains within a narrow band commonly called the varistor voltage. A log-log plot of the instantaneous voltage in volts versus the instantaneous current in amps yields a nearly horizontal line. It is this unique current-voltage characteristic that makes MOVs ideal devices for protection of sensitive electronic circuits against electrical surges, over-voltages, faults or shorts.

When exposed to voltages exceeding their voltage value, MOVs become conductive devices that absorb the energy related to the conductive state and limit dump current to a neutral line or ground plane, thus dissipating some of the excessive power. In addition, when exposed to voltages exceeding their voltage value, MOVs generate heat based upon the over-voltage, thus dissipating some of the over-voltage condition as heat. However, if an over-voltage condition is not discontinued, the MOVs will continue to overheat and eventually can catastrophically fail, i.e., rupture or explode. Such catastrophic failure may destroy the sensitive electronic equipment and components in the vicinity of the MOVs. The destruction of electrical equipment or components in the electrical distribution system can disrupt power to buildings or floors for prolonged periods of time until such components are replaced or repaired. Moreover, the failure of the MOVs in a surge suppression system may allow the fault condition to reach the sensitive electronic equipment the system was designed to protect.

The present invention provides a circuit protection device and a transient voltage surge suppression system incorporating such device to protect an electrical system from catastrophic failure due to excessive over-voltage conditions or repetitive fault conditions.

SUMMARY OF THE INVENTION

In accordance with the present invention, there is provided a voltage suppression device for suppressing voltage surges in an electrical circuit. The device is comprised of a voltage sensitive element having a first surface and a second surface and a predetermined rated voltage value across the first and second surfaces. The voltage sensitive element increases in temperature as voltage applied across the first and second surfaces exceeds the voltage rating. A first terminal is electrically connected to the first surface of the voltage sensitive element, the first terminal being connectable to a ground or neutral line. A thermal element is electrically connected to the second surface of the voltage sensitive element, the thermal element being an electrically conductive solid at room temperature and having a predetermined softening temperature. A second terminal and a third terminal are provided in electrical connection with the thermal element. The second terminal and the third terminal are connectable to an electrical power line, forming an electrical current path and wherein the voltage sensitive element senses the voltage drop between the electrical current path and the first terminal. At least one terminal of the second and third terminals is maintained in contact with the thermal element by the thermal element and is biased away therefrom, wherein the at least one terminal moves away from electrical contact with the thermal element and breaks the electrical current path if an over-voltage condition sensed by the voltage sensitive element exceeds the voltage rating of the voltage sensitive element and causes the voltage sensitive element to heat the thermal element beyond its softening point.

During major fault conditions, overheating of the voltage limiting device causes the bonding material to melt and release the switch actuator device from the voltage limiting device, wherein the biasing means forces the switch actuator towards the switch to operatively engage and actuate same. Actuation of the switch causes initiation of the circuit breaker which breaks the current through the circuit to prevent the circuit from exposure to further fault conditions.

In accordance with another aspect of the present invention, a fault suppression system for suppressing voltage surges in electrical power line to a circuit having a set voltage rating. The system is comprised of a first conductive terminal connectable to an incoming leg of an electrical power line, a second conductive terminal connectable to an outgoing leg of an electrical power line, and a conductive, heat sensitive material electrically connecting the first conductive terminal to the second conductive terminal. The heat sensitive material has a first state at room temperature wherein the material maintains the first conductive terminal in electrical connection with the second conductive terminal against a biasing force acting on the first conductive terminal to move the first conductive terminal out of electrical contact with the second conductive terminal, and a second state above a predetermined temperature wherein the material cannot maintain the first conductive terminal in contact with the second conductive terminal against the biasing force. An array comprised of a plurality of first metal oxide varistors (MOVs) is provided, wherein each of the metal oxide varistors has a like voltage rating that is greater than the set voltage rating of the circuit. The metal oxide varistors are connectable in parallel between the outgoing leg of said electrical power line and a ground or neutral line. A trigger metal oxide varistor is provided having a varistor voltage valve (Vn) that is less than the varistor voltage valve (Vn) of the metal oxide varistors (MOVs) of the array and has a greater voltage rating than the set voltage rating of the system. The trigger metal oxide varistor precedes the array and is in parallel electrical connection with the metal oxide varistors of the array by being in electrical and thermal contact with the conductive, heat sensitive material and the ground or neutral line, wherein if the voltage across the trigger metal oxide varistor exceeds its voltage rating, the trigger metal oxide varistor heats up and causes the conductive, heat sensitive material to change from the first state to the second state.

It is an object of the present invention to provide a circuit protection device to protect sensitive circuit components and systems from current and voltage surges.

It is another object of the present invention to provide a circuit protection device as described above to prevent catastrophic failure of a transient voltage surge suppression (TVSS) system within a circuit that may occur from repetitive circuit faults or from a single fault of excessive proportion.

A further object of the present invention is to provide a circuit protection device as described above that includes a current suppression device and a voltage suppression device.

Another object of the present invention is to provide a circuit protection device as described above for protecting a transient voltage surge suppression system having metal-oxide varistors (MOVs).

A still further object of the present invention is to provide a circuit protection device as described above that includes a metal-oxide varistor as a circuit breaking device.

These and other objects and advantages will become apparent from the following description of a preferred embodiment of the present invention taken together with the accompanying drawings.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein:

FIG. 1 is a schematic illustration of a transient voltage surge suppression system, and a circuit protection circuit in accordance with the present invention;

FIG. 2 is a plan view of a circuit protection device according to a preferred embodiment of the present invention, shown with an over-voltage protection device comprised of an array of metal-oxide varistors (MOVs);

DETAILED DESCRIPTION OF PREFERRED EMBODIMENT

Figure 3:
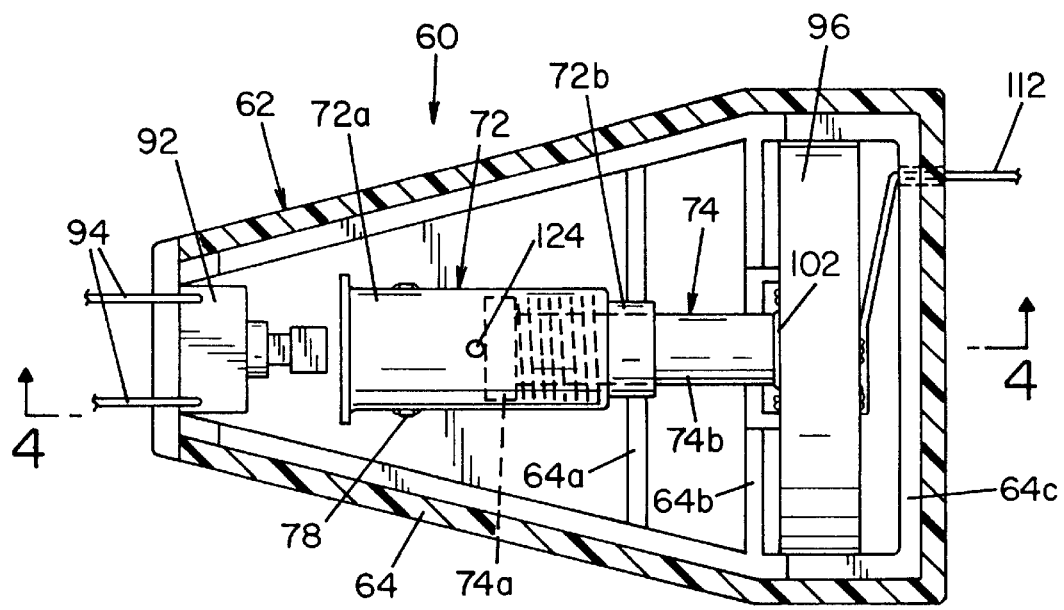
FIG. 3 is an elevational, cross-sectional view taken along lines 3—3 of FIG. 2 showing an over-voltage trip device illustrating one aspect of the present invention.

Referring now to the drawings wherein the showings are for the purpose of illustrating a preferred embodiment of the invention only, and not for the purpose of limiting same, FIG. 1 is a schematic illustration of a transient voltage suppression system 10 for a power supply system for preventing current and voltage fault conditions from reaching a sensitive circuit load. Transient voltage suppression system 10 is comprised of an over-voltage protection device 20 and a circuit protection device 30 for preventing catastrophic failure of protection device 20.

In the embodiment shown, over-voltage protection device 20 is comprised of a plurality of metal-oxide varistors (MOVs), designated 22 in the drawings. Over-voltage protection device 20 is connected in system 10, at points A and B, between a bus line or power line, designated 12, and a neutral line, designated 14. In this arrangement, MOVs 22 of over-voltage protection device 20 are connected in parallel to power line 12 and neutral line 14, as illustrated in FIG. 2.

By way of background, MOVs are primarily comprised of zinc oxide granules that are sintered together to form a disc. Zinc oxide, as a solid, is a highly conductive material. However, minute air gaps or grain boundaries exist between the sintered zinc oxide granules in a MOV, and these air gaps and grain boundaries inhibit current flow at low voltages. At higher voltages, the gaps and boundaries between the zinc oxide granules are not wide enough to block current flow, and thus the MOV becomes a conductive component. This conduction, however, generates significant heat energy in the MOV. MOVs are typically classified and identified by a "nominal voltage." The nominal voltage of an MOV, typically identified by $V_{N(DC)}$, is the voltage at which the device changes from an "off state" (i.e., the state where the MOV is generally non-conductive) and enters its conductive mode of operation. Importantly, this voltage is characterized at the 1 mA point and has specified minimum and maximum voltage levels, referred to hereinafter as $V_{MIN}$ and $V_{MAX}$ respectively. By way of example, and not limitation, a metal-oxide varistor (MOV) having a nominal varistor voltage, $V_{N(DC)}$, of 200 volts may actually exhibit a change from its generally non-conductive to its conductive state at a voltage between a minimum voltage, $V_{MIN}$, of 184 volts and a maximum voltage, $V_{MAX}$, of 228 volts. This range of operating voltages for a MOV of a rated nominal voltage $V_{N(DC)}$ is the result of the nature of the device. In this respect, the actual voltage value of a MOV basically depends on the thickness of the MOV and on the number and size of the zinc oxide granules disposed between the two electrode surfaces. At the present time, it is simply impossible because of the construction and composition of metal-oxide varistors to produce identical devices having identical operating characteristics.

Thus, although all MOVs 22 of over-voltage protection device 20 preferably have the same rated "nominal voltage" $V_{N(DC)}$ at 1 mA, the actual voltage at which each MOV 22 changes from a non-conducting state to a conducting state may vary between a $V_{MIN}$ and a $V_{MAX}$ for the rated nominal voltage value of the MOVs 22 selected. In the context of the present invention, the minimum voltage $V_{MIN}$ of the selected MOVs 22 is important, as will be discussed in greater detail below.

Referring now to surge suppression system 10, MOVs 22 of over-voltage protection device 20 have a rated nominal voltage $V_{N(DC)}$ selected in relation to the rated voltage of the electrical system, i.e., the load, that device 20 is designed to protect. Specifically, MOVs 22 are selected to have a rated nominal voltage $V_{N(DC)}$ rating greater than the system operating voltage. In other words, the rated nominal voltage $V_{N(DC)}$ of MOVs 22 is greater than the load voltage that system 10 is intended to protect. For example, if the voltage rating for the load to be protected is 120 volts, each MOVs 22 would have a rated nominal voltage $V_{N(DC)}$ higher than 120 volts, but not so high that the load or system would be damaged before the nominal voltage $V_{N(DC)}$ of MOVs 22 was reached. In accordance with the present invention, the rated nominal voltage $V_{N(DC)}$ of each MOV 22 is the same (subject to the specified minimum and maximum voltage levels for such rated nominal voltage).

More specifically, the rated nominal voltage $V_{N(DC)}$ of MOVs 22 is selected such that when the voltage across lines 12, 14 exceeds this rated nominal voltage $V_{N(DC)}$ of MOVs 22, they become conductive. As a result of the over-voltage condition, MOVs 22 generate high degrees of heat based upon the over-voltage condition, thus dissipating some of the over-voltage condition as heat. When in their conductive state, MOVs 22 begin to absorb the current energy and limit current to neutral line 14. As will be discussed in greater detail below, if an over-voltage condition is not discontinued, MOVs 22 will overheat and eventually MOVs 22 will catastrophically fail, i.e., rupture or explode. The time in which MOVs 22 fail is dependent upon the applied over-voltage; the greater the applied over-voltage, the faster MOVs 22 heat up, and the shorter their failure time.

In accordance with the present invention, circuit protection device 30 is provided to prevent catastrophic failure of over-voltage protection device 20. Circuit protection device 30 is adapted to be placed "in line," i.e., in main bus line or power line 12, preceding over-voltage protection device 20 so as to experience any over-voltage condition prior thereto, and regulate current flow to over-voltage protection device 20 in response thereto. As best illustrated in FIG. 1, circuit protection device 30 is placed in line in power line 12 at points C and D, and includes a connection to neutral line 14 at point E.

Circuit protection device 30 is generally comprised of a housing 32 containing a current limiting device 50 and a over-voltage trip device 60. As will be appreciated from a further reading of the specification, current limiting device 50 and over-voltage trip device 60 may be separate components electrically connected in series to each other. In the embodiment shown, current limiting device 50 and over-voltage trip device 60 have been combined to form an integral device, i.e., circuit protection device 30.

Housing 32 is basically comprised of an upper housing section 34 and a lower housing section 36. As indicated above, circuit protection device 30 is adapted to be placed in line in power line 12. To this end, in the embodiment shown, housing 32 includes knife blade terminals 42, 44 extending from lower housing 36. Terminals 42, 44 are adapted to be received in slotted connectors (not shown) in power line 12, in a manner that is conventionally known.

Housing 32 defines an interior cavity 38 dimensioned to contain current limiting device 50 and over-voltage trip device 60. A portion of each terminal 42, 44 extends through lower housing section 36 into cavity 38. An intermediate terminal 46 is provided along the inner surface of lower housing section 36 between the inner ends of terminals 42, 44. One end of intermediate terminal 46 is spaced apart from the inner end of terminal 42 to form a gap to receive current limiting device 50. The other end of intermediate terminal 46 is spaced apart from the inner end of terminal 44 to define a gap to receive over-voltage trip device 60.

In the embodiment shown, current limiting device 50 is a conventional fuse having a predetermined current rating and/or surge rating selected to meet the operating requirements of surge suppression system 10. Accordingly, the respective ends of terminals 42 and 46 are preferably formed to receive and hold a conventional fuse.

Figure 4:
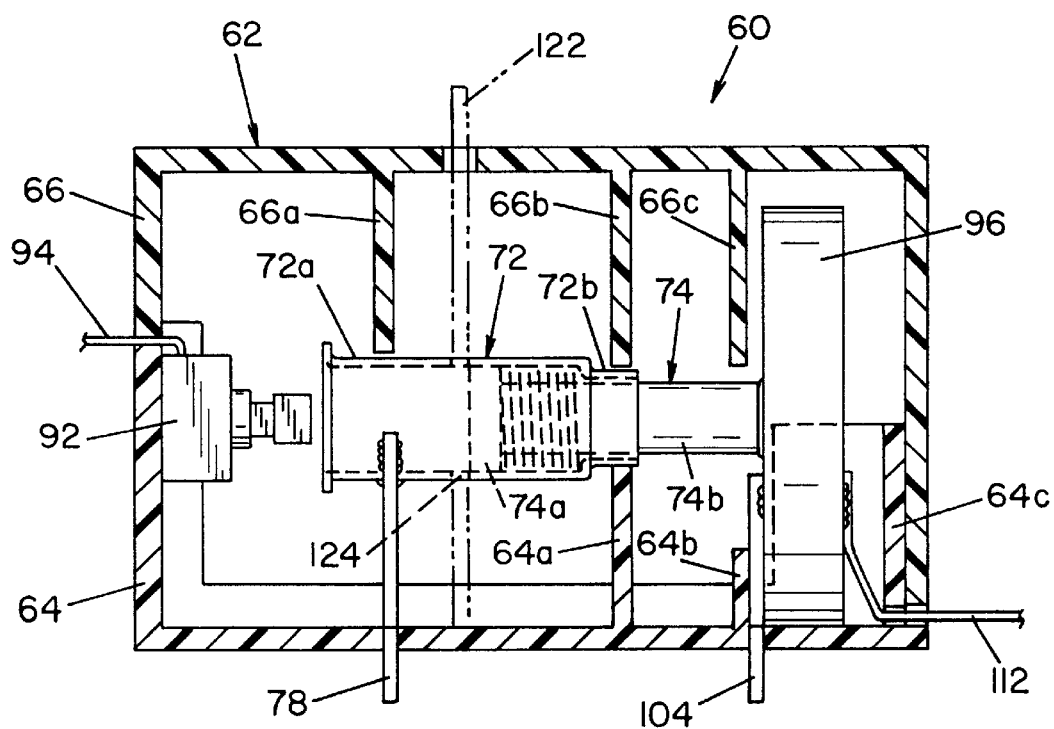
FIG. 4 is a sectional view taken along lines 4—4 of FIG. 3.
Figure 5:
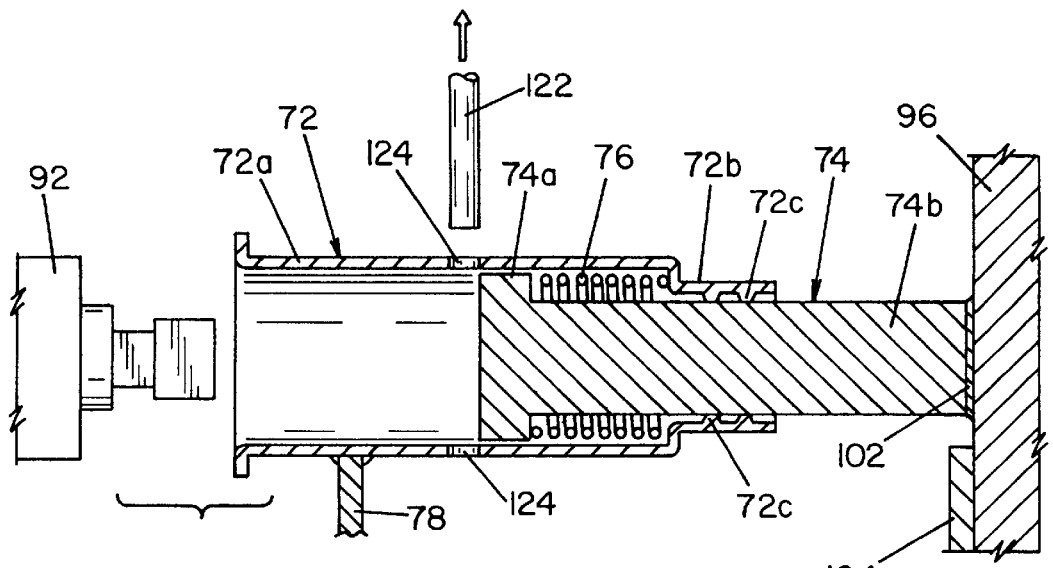
FIG. 5 is an enlarged sectional view of a circuit breaking assembly from the over-voltage trip device shown in FIG. 3, illustrating the relative position of components under normal operating conditions.
Figure 6:
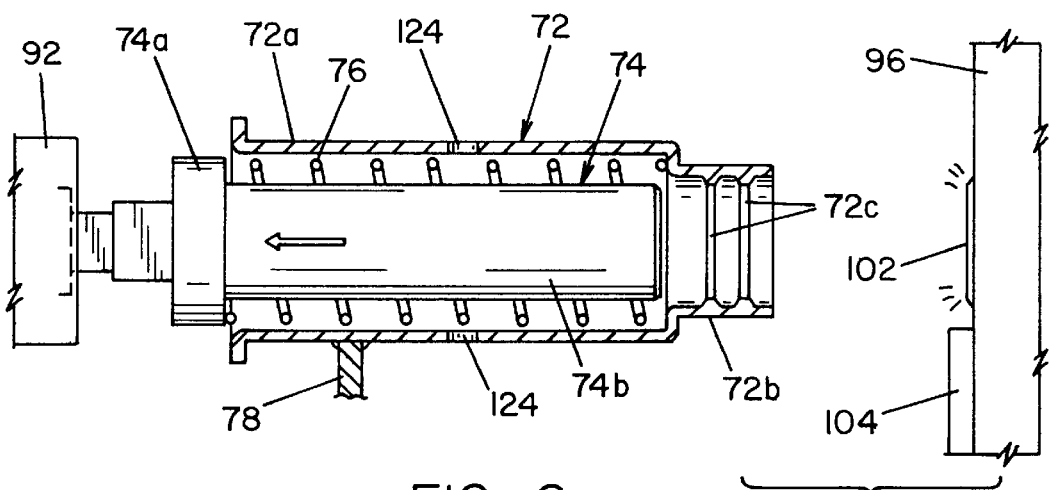
FIG. 6 is a partially sectional view of the components shown in FIG. 5, illustrating the relative position thereof after an over-voltage fault condition.

Referring now to over-voltage trip device 60, in the embodiment shown, device 60 is comprised of a self-contained unit that is insertable and removable from housing 32. As best seen in FIGS. 3 and 4, trip device 60 is generally comprised of a housing 62 comprised of a lower base 64 and a cover 66 mountable thereon. Base 64 and cover 66 each include interior wall sections, designated 64a, 64b, 64c and 66a, 66b and 66c, respectively. Interior wall sections 64a, 64b, 64c, 66a, 66b and 66c basically capture and support a tubular sleeve 72. As best seen in FIGS. 5 and 6, sleeve 72 is generally cylindrical in shape and includes an elongated body portion 72a of a first diameter, and necked-down portion 72b of smaller diameter than body portion 72a. The inner surface of necked-down portion 72b of sleeve 72 includes inwardly projecting ribs 72c. A blade contact 78 extends from the end of body portion 72a of sleeve 72. Contact 78 is dimensioned to extend through base 64 of housing 62 and project therefrom, as best seen in FIG. 4. Sleeve 72 and contact 78 are formed of an electrically conductive material and are joined, such as by brazing, into an integral unit. In the embodiment shown, sleeve 72 and contact 78 are formed of brass.

A plunger 74 is dimensioned to be received within sleeve 72 and to be freely movable therein. Plunger 74 includes a flange portion 74a, dimensioned to be received within body portion 72a of sleeve 72, and a shank portion 74b, dimensioned to be received within necked-down portion 72b of sleeve 72. Shank portion 74b of plunger 74 is dimensioned to be in surface contact with ribs 72c on necked-down portion 72b, as best illustrated in FIG. 5. In accordance with the present invention, plunger 74 is also formed of brass. A biasing element 76, in the form of a helical spring, is disposed within sleeve 72 to surround shank portion 74b of plunger 74. Biasing element 76 is confined within sleeve 72 between flange portion 74a of plunger 74 and necked-down portion 72b of sleeve 72, and is operable to bias plunger 74 along a predetermined path.

Sleeve 72 is oriented such that one end of sleeve 72 is in alignment with a switch 92. Switch 92 is preferably a conventional microswitch having leads extending through housing 62 to be connectable to a remote indicator (not shown), as will be discussed in greater detail below.

The other end of sleeve 72 is oriented to be in alignment with a voltage sensitive trigger element 96. In the embodiment shown, trigger element 96 is preferably comprised of a metal-oxide varistor (MOV) of the type heretofore described (and shall at times be hereinafter referred to as "trigger MOV 96"). Specifically, trigger MOV 96 is a disc formed of zinc oxide granules as referred to above. The plastic coating typically covering the zinc oxide disc has been removed to expose the sprayed on conductive metal surfaces.

In accordance with the present invention, trigger MOV 96 has a predetermined varistor voltage value $V_{N(DC)}$ that is lower than the varistor voltage value $V_{N(DC)}$ of MOVs 22, and has a voltage rating greater than the desired operating voltage of the system to be protected. In this respect, trigger MOV 96 preferably has a lower energy rating and a quicker thermal response time than MOVs 22 of over-voltage protection device 20. In other words, a certain degree of "varistor voltage" discrimination exists between trigger MOV 96 and MOVs 22 at a specific test current. In accordance with the present invention, the maximum voltage $V_{MAX}$ of trigger MOV 96 is less than the minimum voltage $V_{MIN}$ of MOVs 22 of over-voltage protection device 20. Preferably, at least a 3% or at least a 6-volt discrimination exists between the maximum voltage $V_{MAX}$ of trigger MOV 96 and the minimum voltage $V_{MIN}$ of MOVs 22 at one milliamp test current levels. As indicated above, the minimum voltage $V_{MIN}$ and the maximum voltage $V_{MAX}$ relate to the rated nominal voltage $V_{N(DC)}$ for trigger MOV 96 and MOVs 22.

In accordance with the present invention, shank portion 74b of plunger 74 is secured to one face of trigger MOV 96 by means of a thermal element, designated 102 in the drawings. Thermal element 102 is preferably formed of a material that has a relatively low softening temperature or melting temperature. A low melting temperature, metal alloy or a polymer having a low softening temperature may be used. Specifically, thermal element 102 is preferably a solid at room temperature (25°), and is a solid up to temperatures of about 35° C. Preferably thermal element 102 has a melting temperature or a softening temperature between about 70° C. and about 140° C., and more preferably, has a melting temperature or a softening temperature between about 90° C. and about 100° C.

In the embodiment shown, thermal element 102 is formed of an electrically conductive solder material or fusible alloy that has a melting temperature of about 95° C. The exposed surface of the zinc oxide granules of trigger MOV 96 allows the solder forming thermal element 102 to adhere to the surface of trigger MOV 96. When soldered to trigger MOV 96, plunger 74 is in a first position best seen in FIG. 5. Absent thermal element 102, plunger 74 would be biased by biasing element 76 to a second position, illustrated in FIG. 6, wherein plunger 74 is retracted from trigger MOV 96 and is forced by biasing element 76 into engagement with switch 92. Solder 102 does not extend from plunger 74 to blade contact 104. The solder used for blade contact 104, blade contact 78 and terminal 112 is different than solder 102. The solder used for 104, 78 and 112 is the same and is specified as attached.

Importantly, electrical contact between plunger 74 and blade contact 104 is created by the conductive metal surface of MOV 96. Blade contact 104 is disposed adjacent to the surface of trigger MOV 96. As best seen in FIG. 4, blade contact 104 is dimensioned to extend through base 64 and project therefrom. Broadly stated, thermal element 102 is operable to bring two conductive elements into electrically conductive contact with each other. In the embodiment shown in FIGS. 1–6, the conductive elements are brought into electrically conductive contact through thermal element 102.

As will be appreciated from a further reading and understanding of the specification, thermal element may likewise be formed of a non-conductive material that is used to hold two conductive elements in direct electrical contact with each other without deviating from the present invention.

As best seen in FIG. 5, a continuous electrical path is formed through over-voltage trip device 60 between contacts 78 and 104. Specifically, contact 78 is electrically connected to sleeve 72 that is in electrical contact by ribs 72c with plunger 74. Plunger 74, through solder 102, is in electrical contact with contact 104. As best seen in FIG. 3, a terminal 112 extends from the opposite surface of trigger MOV 96. One end of terminal 112 is in electrical contact with the side of trigger MOV 96 that is opposite to plunger 74. Terminal 112 is dimensioned to extend through housing 62 of over-voltage trip device 60, and through housing 32 of circuit protection device 30, as illustrated in FIG. 2.

Two electrical paths are defined in over-voltage trip device 60. As best seen in FIG. 5, a first electrical path, that bypasses trigger MOV 96, is defined from plunger 74 through solder 102 to contact 104. As best seen in FIG. 3, a second electrical path is defined from plunger 74 through trigger MOV 96 to terminal 112.

As indicated above, in an operating configuration, plunger 74 of over-voltage trip device 60 is soldered to trigger MOV 96 as illustrated in FIG. 5. To facilitate assembly and soldering of plunger 74 to trigger MOV 96, a pin 122 is preferably provided to extend through an aperture 124 of sleeve 72. Pin 122 is provided to hold plunger 74 in place during soldering, and may also be used as a locking device to confine plunger 74 in its first position against trigger MOV 96, during shipping and prior to installation. To this end, pin 122 is dimensioned to extend through an opening in cover 66.

Over-voltage trip device 60 is a self-contained unit that is adapted to be insertable into, and removable from, circuit protection device 30. When inserted into circuit protection device 30, contacts 78 and 104 that extend from housing 62 of over-voltage trip device 60, electrically engage intermediate terminal 46 and knife blade terminal 44 to complete an electrical path through circuit protection device 30.

Referring now to the operation of voltage suppression system 10, circuit protection device 30 is placed in line in power line 12 as illustrated in FIG. 1, with blade terminal 42 forming the connection at point "C," and terminal 44 forming the connection at point "D." Terminal 112 from over-voltage trip device 60 is connected to neutral line 14 at point "E" in FIG. 1. (Pin 122 is removed from circuit protection device 30 to allow free movement of plunger 104.)

In this orientation, current limiting device 50 within circuit protection device 30 precedes over-voltage trip device 60 in the direction of current flow. As best illustrated in FIG. 1, in this arrangement, trigger device 96 of over-voltage trip device 60 is basically connected in parallel with MOVs 22 of over-voltage protection device 20, such that any voltage applied to over-voltage protection device 20 will also be experienced by trigger MOV 96 of over-voltage trip device 60.

Together, over-voltage protection device 20 and circuit protection device 30 form a surge suppression system protecting against both current surges and voltage surges in power line 12.

Under normal operating conditions, i.e., at the systems rated voltage and current, current passes through circuit protection device 30. Within over-voltage trip device 60 current flows along the aforementioned first electrical path through sleeve 72, plunger 74, solder 102 and contact 104 to terminal 44, as best seen in FIGS. 2 and 4. Trigger MOV 96 is exposed to the voltage drop across power line 12 and neutral line 14. Because the rated nominal voltage $V_{N(DC)}$ of trigger MOV 96 is above the rated system voltage, absent a fault condition, trigger MOV 96 is essentially non-conductive. In this state, little or no current flows along the aforementioned second electrical path, i.e., from plunger 74 through trigger MOV 96 to terminal 112, as best seen in FIG. 3.

During a fault, an over-current condition or an over-voltage condition may occur. In the event of a high over-current condition, the fuse forming circuit limiting device 50 will sense the fault and open, thereby disconnecting the system from the electrical supply and preventing damage to system components.

In the event of an over-voltage condition or repetitive pulse condition, MOVs 22 of over-voltage protection device 20 and trigger MOV 96 will experience the over-voltage condition. Basically, over-voltage protection device 20 is provided upline of a load or a circuit to suppress an over-voltage condition of a specific level that is deemed harmful to the load or circuit downline. In the event that an over-voltage fault condition reaches this level, the MOVs 22 and trigger MOV 96 will go into an electrically conductive state. When this occurs thermal energy is being created and MOVs 22 and trigger MOV 96 begin absorbing energy and dissipating such energy as heat. As the voltage across MOVs 22 and trigger MOV 96 gets larger, the electrical conductivity of MOVs 22 and trigger MOV 96 increases and greater amounts of heat are generated thereby. The lower energy rating and faster thermal response time of trigger MOV 96 will cause it to heat up more rapidly than MOVs 22 of over-voltage protection device 20.

As best seen in FIGS. 5 and 6, when the temperature of trigger MOV 96 reaches the melting temperature of the solder 102, plunger 74 will be released from rigid connection to trigger MOV 96. Biasing element 76 will force plunger 74 away from trigger MOV 96, and breaks the current path through solder 102 to contact 104, thereby creating an open circuit and preventing further current to the system. Once current to the trigger MOV 96 is cut off, no further heating of trigger MOV 96 occurs. Because the maximum voltage $V_{MAX}$ of trigger MOV 96 is less than the minimum voltage $V_{MIN}$ of MOVs 22, over-voltage protection device 20 is protected from damage. Thus, over-voltage trip device 60 is designed to break current through system 10 in the event of a severe over-voltage condition and to prevent damage to over-voltage protection device 20.

In the event that the fault condition is extremely severe, the possibility exists that trigger MOV 96 will catastrophically fail. By being contained within housing 62, which itself is contained within housing 32 of circuit protection device 30, any catastrophic failure of trigger MOV 96 will thus be contained within such housings so as to prevent damage and destruction to components within the vicinity of the over-voltage trip device. Thus, by providing a trigger MOV 96 having a varistor voltage value less than the varistor voltage value for MOVs 22 of over-voltage protection device 20, current to the system load will preferably be cut off when the overheating of trigger MOV 96 reaches the melting point of solder 102, and in severe situations, the catastrophic failure of trigger MOV 96 would likewise terminate current to the system. In either event, an open circuit results before damage to MOVs 22 and over-voltage protection device 20 occurs.

As best seen in FIG. 3, in addition to terminating current flow, biasing element 76 will also force plunger 74 into operative engagement with switch 92, thereby actuating switch 92. Switch 92 is preferably operable to send a signal to a remote indicator (not shown) to provide an indication of where in a service grid system the open circuit exists. As will be appreciated, over-voltage trip device 60 is intended for single-use operation. Once device 60 has "tripped," it is easily removed and replaced after the cause of the fault condition has been corrected. The present invention thus provides a transient voltage suppression system 10 and a circuit protection device 30 that protects an electrical system from both an over-voltage fault condition and an over-current fault condition. The housing will not contain a catastrophic failure. The housing will contain the arcing associated with the plunger retracting from the MOV surface or during load-break operation.

In the context of suppression system 10, it will be appreciated by those skilled in the art that notwithstanding that trigger MOV 96 is designed to protect MOVs 22 of over-voltage protection device 20, and in extreme cases will fail prior to MOVs 22, MOVs 22 will experience the over-voltage fault conditions. As noted above, some of MOVs 22 may be MOVs having an operating voltage at or near $V_{MIN}$, and therefore, will switch to an over-voltage conductive state prior to the other MOVs 22 in over-voltage protection device 20. Depending on the severity of the over-voltage condition experienced by such a MOV, its integrity may be degraded wherein failure of the MOV may occur from subsequent over-voltage fault condition. Stated another way, a MOV is also rated based upon the number of fault condition pulses it can withstand. A surge current rating curve identifies the number of pulses of a given current level and duration that a MOV can withstand. A MOV may be able to withstand an indefinite number of pulses of low current and short duration, but may be able to withstand only a few pulses of 10,000 amps of 20 $\mu$s impulse duration. Thus, in the context of using system 10 as a suppression system for service power lines to protect a service system from lightning strikes, after several "triggerings" of over-voltage trip device 60, the system operator should also replace over-voltage protection device 20 (i.e., the array of MOVs 22), in that in view of the extreme conditions (lightning strikes) it likely has experienced, the useful cycle life of MOVs 22 may occur during the next fault condition. The number of times over-voltage trip device 60 may be replaced before over-voltage protection device 20 (i.e., MOVs 22) should also be replaced will of course depend upon the nature of the use of over-voltage protection device 20, the types of fault conditions experienced by device 20, as well as the voltage discrimination between trigger MOV 96 and MOVs 22. It is therefore important to recognize that although over-voltage trip device 60 is replaceable in system 10, the useful life of over-voltage protection device 10 is not indefinite.

Figure 7:
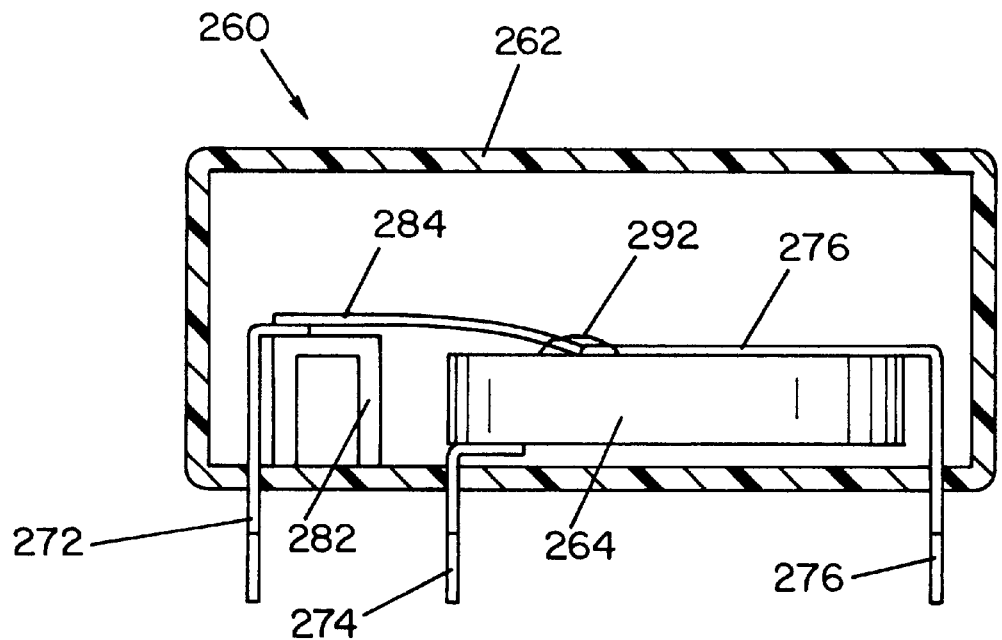
FIG. 7 is a partially sectional view of an over-voltage trip device, illustrating an alternate embodiment of the present invention.
Figure 8:
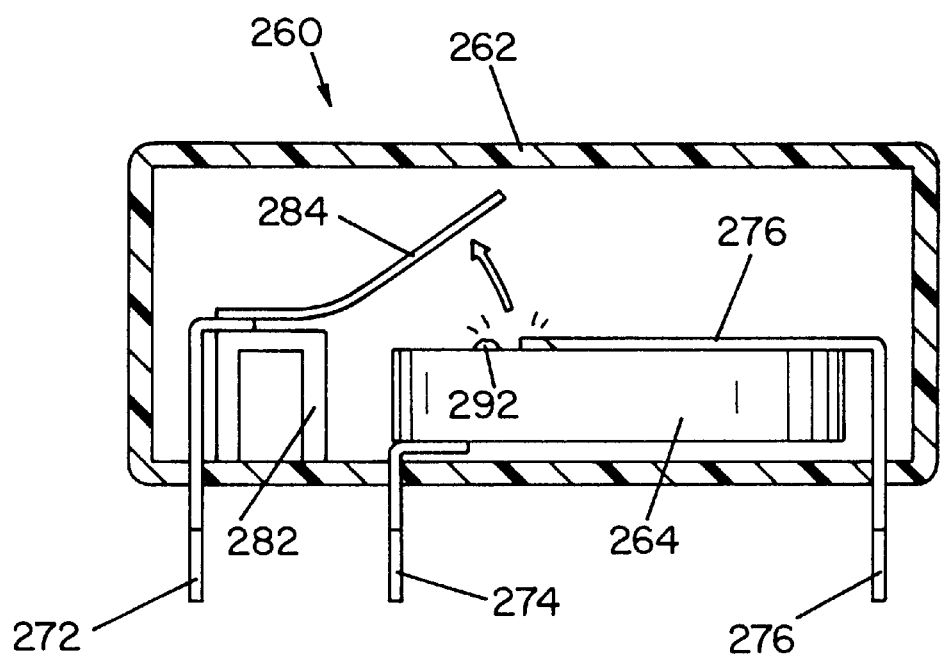
FIG. 8 is a view of the over-voltage trip device shown in FIG. 7, showing such device in a non-conductive condition as a result of an over-voltage fault.

Referring now to FIGS. 7 and 8, a cross-sectional view of an over-voltage trip device 260 illustrating an alternate embodiment of the present invention is shown. Over-voltage trip device 260 is comprised of a housing 262 containing a voltage sensitive trigger element 264. As in the previously described embodiment shown in FIGS. 1–6, trigger element 264 is preferably comprised of a metal-oxide varistor (MOV) of the type heretofore described.

In accordance with the present invention, trigger MOV 264 has a predetermined varistor voltage value $V_{N(DC)}$ that is lower than the varistor voltage value $V_{N(DC)}$ of MOVs 22, and a voltage rating greater than the desired operating voltage of the system to be protected. In this respect, trigger MOV 264 preferably has a lower energy rating and a quicker thermal response time than MOVS 22 of over-voltage protection device 20. In other words, a certain degree of "varistor voltage" discrimination exists between trigger MOV 264 and MOVs 22 at a specific test current. Preferably, at least a 3% or at least a 6-volt discrimination exists at one milliamp test current levels.

Three conductive elements in the form of contact terminals, designated 272, 274 and 276 in the drawings, extend through housing 262. Contact terminal 274 is in electrical contact with one side of trigger 264 while contact terminal 276 is in electrical contact with the other side of trigger MOV 264. As shown in FIGS. 7 and 8, in the embodiment shown, terminal contact 276 is dimensioned to extend across a major portion of the surface of trigger MOV 264.

Contact terminal 272 is mounted onto a post or support 282. A contact blade 284 is provided to place contact terminal 272 in electrical contact with contact terminal 276. Contact blade 284 is formed of a "spring" metal and has a normally bent configuration, best seen in FIG. 8. One end of contact blade 284 is mounted onto contact terminal 272, in electrically conductive contact therewith. In accordance with the present invention, contact blade 284 is forced from its normal configuration (shown in FIG. 8) into electrically conductive contact with contact terminal 276, as shown in FIG. 7. In the embodiment shown, contact blade 284 is dimensioned to be in direct physical contact with contact terminal 276. A terminal element 292 maintains contact blade 284 in physical and electrical contact with contact terminal 276. As in the previous embodiment, thermal element 292 is preferably formed of a material that has a relatively low softening temperature or melting temperature. In the embodiment shown, because contact blade 284 is in physical and electrical contact with contact terminal 276, thermal element 292 need not be an electrically conductive material. In this respect, thermal element 292 may be a hot melt adhesive, having a softening temperature of between about 70° C. and about 140° C., and more preferably about 90° C. to about 100° C. If electrical conductivity is desired, thermal element 292 may be a metal solder, as previously described with respect to thermal element 102.

Referring now to its operation, over-voltage trip device 260 may replace over-voltage trip device 60 in circuit protection device 30 to operate with a current limiting device 50, or may be used alone in conjunction with over-voltage protection device 20. In the latter configuration, a over-voltage trip device 260 would be connected into surge suppression system 10 with contact terminal 272 connected to power line 12 at point "C" (see FIG. 1) and contact terminal 276 connected to power line 12 at point "D." Contact terminal 274 would be connected to ground or neutral line 14 at point "E." Two electrical paths are defined in over-voltage trip device 260. A first electrical path, that bypasses trigger MOV 264, is defined from contact terminal 272 through contact blade 284 to contact terminal 276. A second electrical path is defined from contact terminal 272 through contact blade 284 and through trigger element 264 to contact terminal 274.

Under normal operating conditions, current flows within over-voltage trip device 260 along the aforementioned first electrical path through contact terminal 272 and contact blade 284 to contact terminal 276. Trigger MOV 264 is exposed to the voltage drop across power line 12 and neutral line 14. Because the nominal voltage $V_{N(DC)}$ of trigger MOV 264 is above the rated system voltage, absent a fault condition, trigger MOV 264 is essentially non-conductive. In this state, little or no current flows along the aforementioned second electrical path, i.e., from contact blade 284 through trigger MOV 264 to contact terminal 274.

In the event of an over-voltage condition or repetitive pulse condition, MOVs 22 of over-voltage protection device 20 and trigger MOV 264 will experience the over-voltage condition. Basically, over-voltage protection device 20 is provided upline of a load or a circuit to suppress an over-voltage condition of a specific level that is deemed harmful to the load or circuit downline. In the event that an over-voltage fault condition reaches this level, the MOVs 22 and trigger MOV 264 will go into an electrically conductive state allowing current to pass therethrough. When this occurs thermal energy is being created and MOVs 22 and trigger MOV 264 begin absorbing energy and dissipating heat. As the voltage across MOVs 22 and trigger MOV 264 gets larger, the electrical conductivity of MOVs 22 and trigger MOV 264 increases and a greater amount of current passes through them. The lower energy rating and faster thermal response time of trigger MOV 266 will cause it to heat up more rapidly than MOVs 22 of over-voltage protection device 20. As best seen in FIG. 8, at the melting temperature of thermal element 292, contact blade 284 will be released from contact with terminal 276, and the inherent spring resiliency of contact blade 284 will cause it to return to its normal configuration as shown in FIG. 8, and breaks the current path to contact terminal 276, thereby creating an open circuit and preventing further current to the system. Once current to the trigger MOV 264 is cut off, no further heating of trigger MOV 264 occurs. Because trigger MOV 264 has a lower nominal voltage $V_{N(DC)}$ than the MOVs 22 in over-voltage protection device 20, over-voltage protection device 20 is protected from damage. Thus, over-voltage trip device 260 is designed to break current through system 10 in the event of a severe over-voltage condition and to prevent damage to over-voltage protection device 20. In the event where the fault condition is extremely severe, the possibility exists that trigger element 264 will catastrophically fail. By being contained within housing 262, any catastrophic failure of trigger MOV 264 will thus be contained within such housing so as to prevent damage and destruction to components within the vicinity of the over-voltage trip device.

Thus, by providing a trigger MOV 264 having a varistor voltage value $V_{N(DC)}$ less than the varistor voltage value $V_{N(DC)}$ for MOVs 22 of over-voltage protection device 20, current to the system load will preferably be cut off when the overheating of trigger MOV 264 reaches the melting point of thermal element 292, and in severe situations, the catastrophic failure of trigger MOV 264 would likewise terminate current to the system. In either event, an open circuit results before damage to MOVs 22 and over-voltage protection device 20 occurs.

FIGS. 7 and 8 thus show an alternate embodiment of an over-voltage trip device, wherein the thermal element merely maintains two conductive elements in physical and electrical contact with each other, and unlike the embodiment shown in FIG. 1–6, the thermal element, in and of itself, forms no part of the electrical paths.

Figure 9:
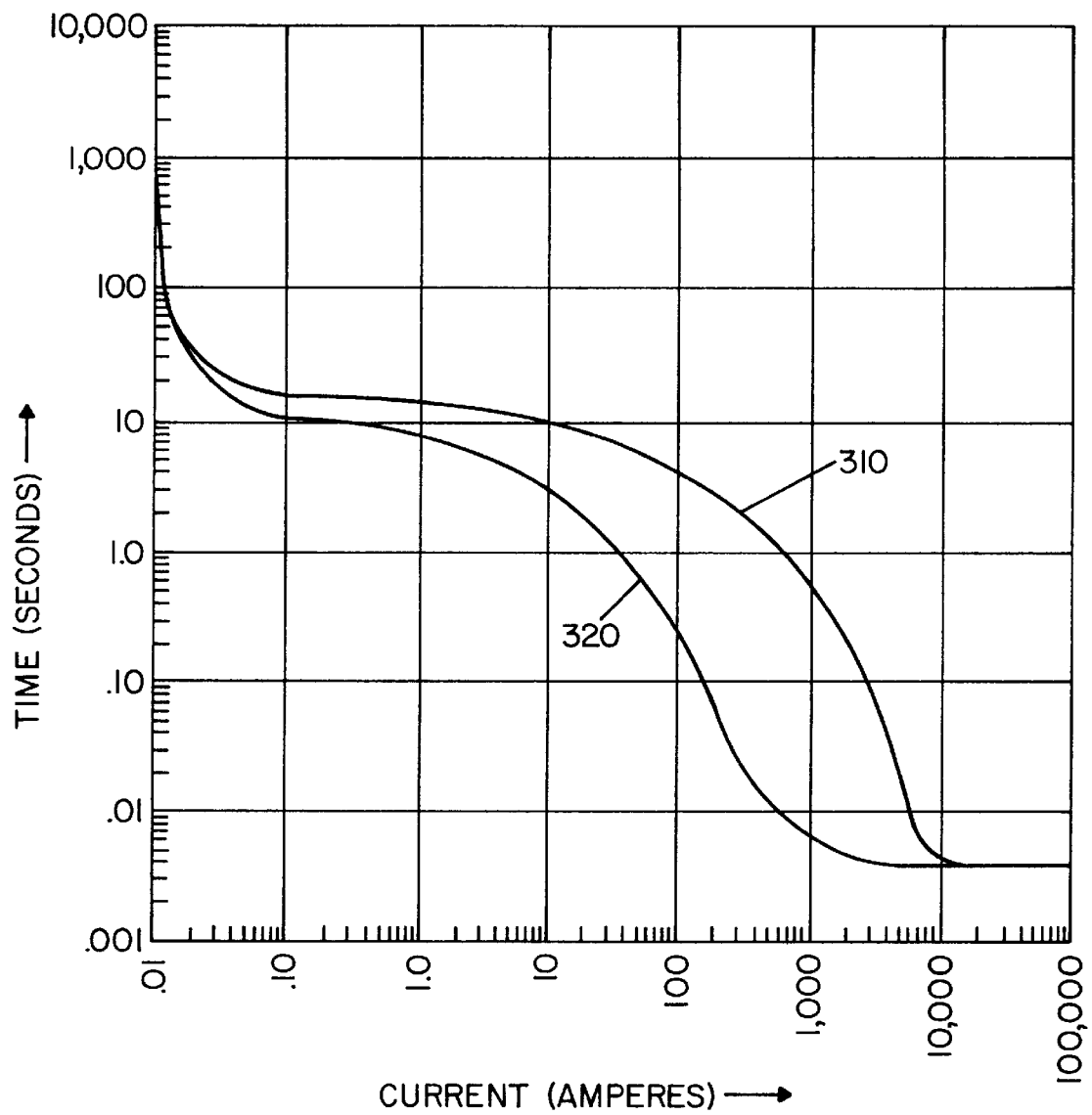
FIG. 9 is a graph showing response times of an over-voltage trip device according to the present invention.

Referring now to FIG. 9, a logarithmic graph showing response times for an over-voltage trip device 60 is provided. The graph shows response times (in seconds) for varying fault currents (in amperes) at two different test voltages. The graph was generated based upon test results using an over-voltage trip device 60 having a trigger MOV 96 having a rated nominal voltage $V_{N(DC)}$ of 140 volts. Line 310 shows the response time of an over-voltage trigger device 60 at a test voltage of 175 volts (125% of the rated nominal voltage $V_{N(DC)}$ of trigger MOV 96). Line 320 shows the response time of an over-voltage trigger device 60 at a test voltage of 240 volts (170% of the nominal voltage $V_{N(DC)}$ of trigger MOV 96). The graph shows that the response time of over-voltage trigger device 60 has a lower limit of about 4 milliseconds due to the physical operating limitations of the structure. Thus, at fault currents exceeding approximately 2,000 amperes, the fastest response time remains essentially the same (at approximately 4 milliseconds) irrespective of the applied voltage. At the lower extremes of fault conditions, i.e., at 3 milliamperes and lower, the current flowing through trigger MOV 96 is insufficient to generate enough heat to melt thermal element 102 so as to cause plunger 74 to retract and break the circuit. At current levels below 3 milliamperes, graph lines 310 and 320 essentially become vertical lines, indicating an indefinite response time at extremely low fault current conditions.

The foregoing describes preferred embodiments of the present invention. It should be appreciated that these embodiments are described for purposes of illustration only, and that numerous alterations and modifications may be practiced by those skilled in the art without departing from the spirit and scope of the invention. For example, the present invention has heretofore been defined with respect to a device including both a current limiting device 50 and an over-voltage trip device 60. It will be appreciated that these may be separate elements within a circuit, and a device containing only over-voltage trip device 60 may be provided within a separate housing without deviating from the concept of the present invention. It is intended that all such modifications and alterations be included insofar as they come within the scope of the invention as claimed or the equivalents thereof.

Having described the invention, the following is claimed:

1. A voltage suppression device for suppressing voltage surges in an electrical circuit, said device comprised of:
   a voltage sensitive element having a first surface and a second surface and a predetermined voltage rating across said first and second surfaces, said voltage sensitive element increasing in temperature as voltage applied across said first and second surfaces exceeds said voltage rating;
   a first terminal electrically connected to said first surface of said voltage sensitive element, said first terminal being connectable to a ground or neutral line;
   a thermal element electrically connected to said second surface of said voltage sensitive element, said thermal element being an electrically conductive solid at room temperature and having a predetermined softening temperature;
   a second terminal and a third terminal in electrical connection with said thermal element, said second terminal and said third terminal being connectable to an electrical power line and forming an electrical current path, said voltage sensitive element sensing the voltage drop between said electrical current path and said first terminal; and,
   at least one terminal of said second and third terminals being, comprised of:
      a) a conductive sleeve, one end of said sleeve being adjacent said voltage sensitive element,
      b) an electrically conductive plunger within said sleeve, said plunger being secured to said voltage sensitive element by said thermal element, and
      c) biasing means disposed between said sleeve and said plunger for biasing said plunger away from said voltage sensitive element, wherein said plunger moves away from electrical contact with said thermal element and breaks said electrical current path if an over-voltage condition sensed by said voltage sensitive element exceeds the voltage rating of said voltage sensitive element and causes said voltage sensitive element to heat said thermal element beyond its softening point.

2. A voltage suppression device as defined in claim 1, wherein said voltage sensitive element is a metal oxide varistor (MOV).

3. A voltage suppression device as defined in claim 1, wherein said thermal element is a fusible alloy.

4. A voltage suppression device as defined in claim 3, wherein said fusible alloy is a metal solder having a melting point of about 95° C.

5. A voltage suppression device as defined in claim 1, wherein said thermal element is an electrically conductive polymer.

6. A voltage suppression device as defined in claim 1, further comprising a housing encasing said voltage sensitive element, said thermal element and said terminals.

7. A voltage suppression device as defined in claim 1, further comprising a switch device, another end of said conductive sleeve being adjacent said switch device, wherein said plunger is oriented to be biased into engagement with, and to initiate said switch device when said plunger is released by said thermal element.

8. A fault suppression system for suppressing voltage surges in electrical power line to a circuit having a set voltage rating, said system comprised of:
   a first conductive terminal connectable to an incoming leg of an electrical power line;
   a second conductive terminal connectable to an outgoing leg of an electrical power line;
   a conductive, heat sensitive material electrically connecting said first conductive terminal to said second conductive terminal, said heat sensitive material having a first state at room temperature wherein said material maintains said first conductive terminal in electrical connection with said second conductive terminal against a biasing force acting on said first conductive terminal to move said first conductive terminal out of electrical contact with said second conductive terminal, and a second state above a predetermined temperature wherein said material cannot maintain said first conductive terminal in contact with said second conductive terminal against said biasing force;
   an array comprised of a plurality of first metal oxide varistors (MOVs), each of said metal oxide varistors having a like voltage rating that is greater than the set voltage rating of said circuit, said metal oxide varistors being connectable in parallel between said outgoing leg of said electrical power line and a ground or neutral line; and,
   a trigger metal oxide varistor having a varistor voltage value (Vn) that is less than the varistor voltage value (Vn) of said metal oxide varistors (MOVs) of said array and is greater than the set voltage rating of said system, said trigger metal oxide varistor, preceding said array and being in parallel electrical connection with said metal oxide varistors of said array by being in electrical and thermal contact with said conductive, heat sensitive material and said ground or neutral line, wherein if said voltage across said trigger metal oxide varistor exceeds its voltage rating, said trigger metal oxide varistor heats up and causes said conductive, heat sensitive material to change from said first state to said second state.

9. A fault suppression system as defined in claim 8, wherein said first conductive terminal is a metallic plunger confined within a metallic sleeve, said plunger being biased away from said trigger metal oxide varistor by a spring within said sleeve.

10. A fault suppression system as defined in claim 8, wherein said first conductive terminal, said conductive, heat sensitive material and said trigger metal oxide varistor are contained within a housing.

11. A fault suppression system as defined in claim 10, wherein said housing is separable from said array.

12. A fault suppression system for suppressing voltage surges in electrical power line to a circuit having a set voltage rating, said system comprised of:

a first conductive terminal connectable to an incoming leg of an electrical power line;

a second conductive terminal connectable to an outgoing leg of an electrical power line;

a heat sensitive material connecting said first conductive terminal to said second conductive terminal, said heat sensitive material having a first state at room temperature wherein said material maintains said first conductive terminal in connection with said second conductive terminal against a biasing force acting on said first conductive terminal to move said first conductive terminal out of contact with said second conductive terminal, and a second state above a predetermined temperature wherein said material cannot maintain said first conductive terminal in contact with said second conductive terminal against said biasing force;

an array comprised of a plurality of first metal oxide varistors (MOVs), each of said metal oxide varistors having a transition voltage wherein said MOV changes from a non-conductive state to a conductive state, the transition voltage of all of said metal oxide varistors being greater than the operating voltage of said circuit, said metal oxide varistors being connectable in parallel between said outgoing leg of said electrical power line and a ground or neutral line; and, a trigger metal oxide varistor having a transition voltage that is less than the transition voltages of all of said metal oxide varistors (MOVs) of said array and is greater than the set voltage rating of said system, said trigger metal oxide varistor, preceding said array and being in parallel electrical connection with said metal oxide varistors of said array by being in electrical and thermal contact with said heat sensitive material and with said ground or neutral line, wherein if said voltage across said trigger metal oxide varistor exceeds its transition voltage, said trigger metal oxide varistor heats up and causes said heat sensitive material to change from said first state to said second state.

* * * * *